Nov. 2, 1948.  C. M. HATHAWAY  2,452,753
COMPARATOR GAUGE
Filed Oct. 13, 1945
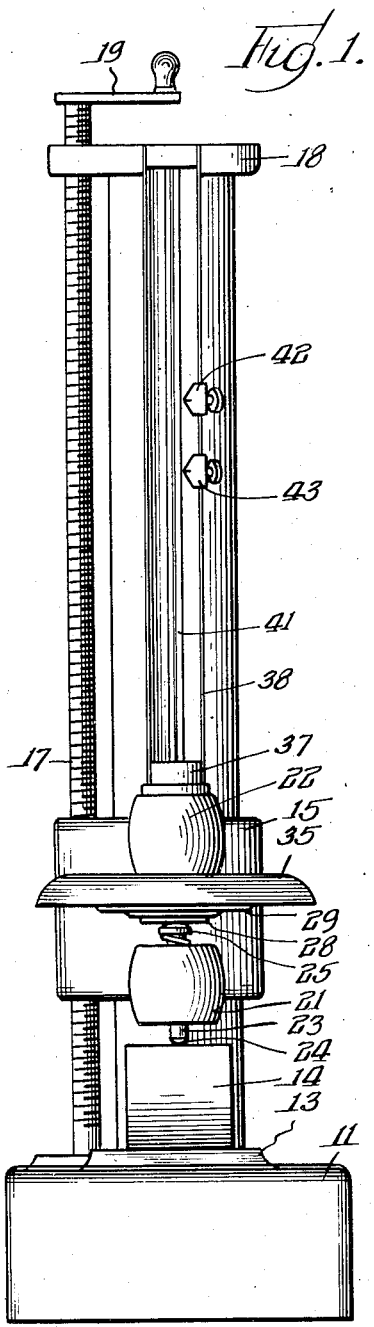
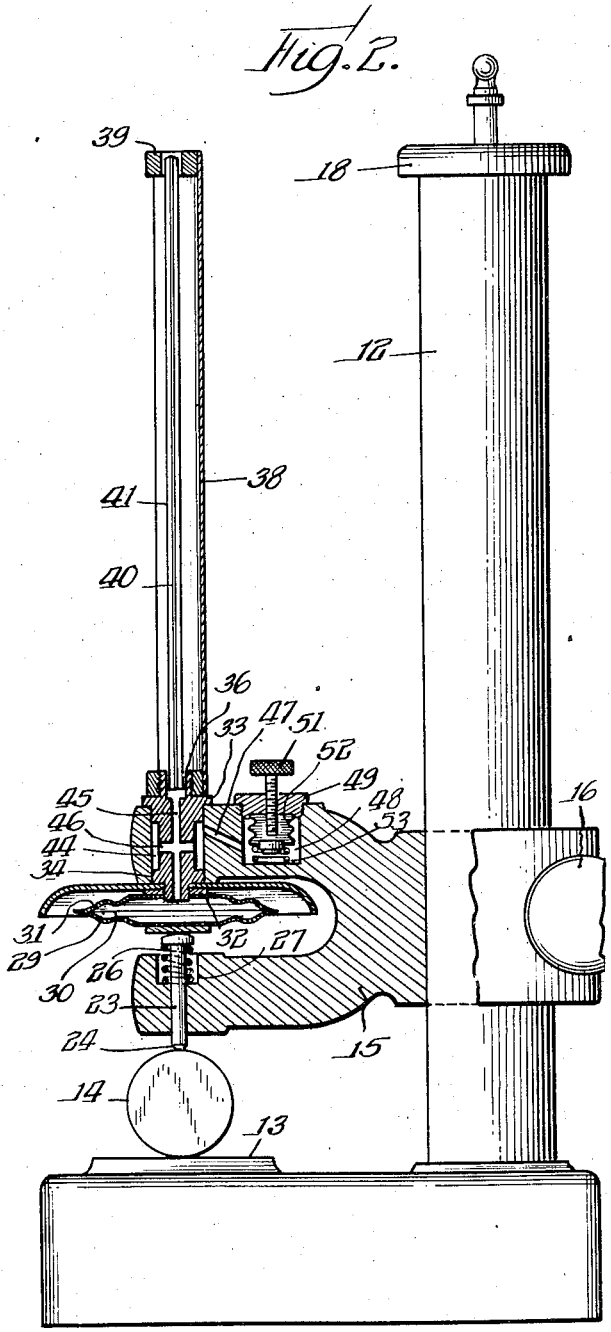
INVENTOR.
Claude M. Hathaway
BY
Moore, Olson & Trexler
Attys.

Patented Nov. 2, 1948

2,452,753

UNITED STATES PATENT OFFICE 2,452,753

COMPARATOR GAUGE

Claude M. Hathaway, Denver, Colo.

Application October 13, 1945, Serial No. 622,215

1 Claim. (Cl. 33—147)

The present invention relates to comparator gages and more particularly to an improved simplified comparator gage of the mechanical hydraulic type.

Heretofore comparator gages of various types have been employed in industry for controlling the production of material. The more precision products require close inspection so that within relatively narrow limits gages are provided which are generally termed "go" and "no-go" gages.

In order to obtain a visual indication of the dimension of a device, it has been found convenient to use electric comparator gages which are very sensitive and highly accurate. Such devices, however, involve an appreciable investment where a large number are employed for production purposes. A simpler gage of the mechanical type has found great favor for indicating the deviation from the desired standard. Such mechanical gages have a feeler rod which engages the object and which serves to move a pointer about a scale, generally graduated in thousandths of an inch or in fractions thereof. Such mechanical comparators have the disadvantage of being susceptible to damage through rough usage or shock. Further such devices when used a great deal show wear thereby reducing their accuracy. It, therefore, would be desirable, particularly for mass production, to provide a simple yet accurate visual indicating comparator gage which is not subject to damage by ordinary shocks and rough usage and which has a minimum of wear and a maximum accurate life.

In accordance with the present invention the foregoing objectives are obtained by providing a comparator gage utilizing mechanical and hydraulic multiplication to produce a visual indication. This visual indication may indicate for example dimensions above and below certain maximum or minimum and the dimensions within a certain tolerance range. Such device may be constructed so as to be as sensitive as any of the other commonly used comparator gages and yet not be subject to damage as readily through rough usage and through frequent use over a long period of time as is the case in production line gaging.

It, therefore, is an object of the present invention to provide an improved comparator gage which overcomes certain of the above mentioned disadvantages of the prior art.

It is another object of the present invention to provide an improved comparator gage which is relatively simple to manufacture and which is rugged and accurate.

Other and further objects of the present invention subsequently will become apparent by reference to the following description taken in connection with the accompanying drawing wherein Figure 1 is a front view of a comparator gage embodying the present invention; and Figure 2 is a side view of the apparatus shown in Figure 1 with portions thereof illustrated in cross section.

Referring more particularly to the drawings there is shown a comparator gage having a base 11 supporting a vertical column 12. The base 11 may be provided with a suitable anvil surface 13 for receiving objects such as the piece of material 14 which is to be measured. The column 12 supports an arm or bracket 15 which is adapted to be locked in position on the column 12 by a knob and screw 16, which passes through the bifurcated rear portion of the bracket 15. The bracket 15 may be raised and lowered by a screw threaded member 17 which passes through a suitable threaded aperture in the bracket 15. The screw threaded member 17 extends from the base 11 to the top of the column 12 which carries a cap member 18. The threaded shaft 17 extends above the cap member 18 so as to support a crank or handle 19 by which the threaded shaft may be actuated to raise or lower the arm 15 when the hand screw clamping member 16 has been loosened. After the bracket 15 has been moved to the desired elevation, the hand screw 16 is actuated to clamp the bracket 15 in position so that regardless of any causes or disturbances the bracket 15 will remain fixed.

The bracket 15 has a bifurcated forward portion comprising the lower member 21 and an upper member 22. The lower member 21 carries a feeler pin 23 which may have a hardened contact surface 24. The feeler pin 23 has a head 25 which is engaged by a spring 26 mounted in a recess 27 in the lower half of the bracket 15. The head 25 of the feeler pin 23 engages a plate 28 which is secured to a hollow structure formed of two similar corrugated concave flexible metal diaphragms 29 and 31 secured together at their peripheries. The upper diaphragm 31 is also provided with a reinforcement plate 32. Both the reinforcement plate 32 and the upper diaphragm 31 are provided with a central aperture which is threaded so as to receive a threaded insert member 33. The threaded insert member 33 is supported in a suitable recess or cylindrical aperture 34 formed in the upper portion 22 of the bracket 15. The lower threaded portion of the member 33 also passes through a saucer shaped guard 35 which is provided for the protection of the diaphragms 29 and 31.

The member 33 has a collar portion which extends beyond the cylindrical opening 34 in the arm 15 so as to serve as a support for the member 33. Just above the collar portion there is a threaded extension 36 which is surrounded by a threaded member 37. The threaded member 37 carries an elongated semi-cylindrical metal guard 38 provided at its top with an apertured cylindrical washer-like member 39. This guard surrounds and protects a glass tube 41 which has a relatively small bore therein, similar to the bore in a thermometer. The lower end of the glass gage 41 is mounted in the extension 36 of the member 33 in a suitable manner by cement or other means so as to provide a fluid-tight connection therebetween. The guard 38 at one side carries a pair of adjustable clips 42 and 43 which may be positioned for gaging purposes so as to indicate a dimension exceeding a predetermined tolerance and also a dimension less than a predetermined minimum tolerance.

The member 33 is provided at an intermediate portion with a recess 44 so as to provide an annular channel. The member 33 is also provided with a central longitudinal passage 45 which is connected by transverse passages 46 to the annular passage 44. The annular passage 44 is connected by an angularly arranged passage 47 with a chamber or recess 48 formed in the upper arm portion 22 of the bracket 15.

The recess 48 is provided with a threaded cap 49 which carries an adjustable screw 51. The adjustable screw 51 engages the inner surface of the bellows member 52. The recess 48 also contains a spring 53 bearing upwardly against the bellows 52. The cap 49 together with the adjustable screw 51 and the bellows 52 serves as an adjustable displacement member for adjusting the zero position of the gage.

The chamber 30 formed by the two corrugated diaphragms 29 and 31 together with the passages 45, 46, 47, the recess 48 and a portion of the bore 40 in the gage glass 41 are filled with a fluid. A displacement of the feeler pin 23 produces a change in the volume of the cavity 30 due to a flexing of the diaphragms 29 and 31 resulting in a displacement of the fluid in the gage glass 41. The spring 26 is provided to insure close contact between the head 25 of the feeler pin and the plate 28 which is secured to the bottom diaphragm 29.

To set the gage for a gaging operation, a standard gage block of the minimum allowable dimensions is placed upon the anvil 13. The bracket 15 is loosened or unclamped from the support post 12 and the handle 19 is actuated to cause the threaded shaft 17 to bring the bracket 15 to such position that the contact surface 24 of the feeler pin 23 just engages the gage block. Thereafter the bracket 15 is lowered by a very small amount to cause the liquid to rise in the column 41. The bracket 15 thereupon may be clamped in position. The lower indicator 43 is then moved to the height of the liquid in the column. The gage block thereupon is removed, and a gage block of standard size is inserted. The height of the fluid thereupon should rise some distance above the setting of the lower marker or indicator 43. The upper marker 42 is positioned above the level of the fluid in the column 41 a distance equal to the distance which the lower marker 43 is positioned below the level of the column of the fluid. Thereafter the maximum tolerance gage block is inserted and the position of the upper indicator 42 is checked. The two indicators 42 and 43 therefore set the limits within which subsequent gaging operations determine acceptable objects and dimensions within the tolerances specified. If engaging an article or object the column rises above the upper gage indicator 42, such devices may be marked as "over-diameter" and placed in the corresponding reject compartment. Those articles causing a rise of fluid between the gages 42 and 43 are placed in suitable trays as being acceptable. The objects failing to raise the level of the fluid to the low gage indicator 43 are clearly under-diameter, and hence are rejected as scrap.

The zero adjuster provides a convenient means for compensating for any loss of fluid or for bringing a normal zero position of the fluid in the column 41, up in a range where it may readily be observed by an operator. While the zero adjuster has been shown as utilizing a bellows, a diaphragm, rubber bulb or the like may be used as a displacement member for adjusting the zero position of the column of the fluid.

Since there are no springs, gears, or other wearing parts required to produce the indication, there is no possibility of introducing errors either due to continued use of the apparatus or due to shocks or abuse frequently occurring in production line inspection.

While for the purpose of illustrating and describing the present invention a preferred embodiment has been shown in the drawing it is to be understood that the invention is not to be limited thereby since such variations in the instrumentalities employed and in their arrangement are contemplated as may be commensurate with the spirit and scope of the invention set forth in the following claim.

This invention is hereby claimed as follows:

In a comparator gage having an anvil, a vertical column and adjustably positioned arm on said column, the combination comprising a pair of concave corrugated metal diaphragms connected together at their peripheries to form a liquid chamber and adapted to be moved by objects to be gaged to decrease the volume of said chamber, a support mounted on said arm, said support being connected only to the central portion of the top diaphragm to hold said chamber in a position depending from said arm to permit free movement of the periphery of said chamber, and a protective guard mounted between said arm and said chamber and extending beyond the periphery thereof, said guard being spaced away from said chamber except adjacent the center thereof.

CLAUDE M. HATHAWAY.

REFERENCES CITED

The following references are of record in the file of this patent:

UNITED STATES PATENTS

| Number | Name | Date |
|---|---|---|
| 1,258,426 | Mackintosh | Mar. 5, 1918 |
| 1,266,313 | Prestwich | May 14, 1918 |
| 1,316,844 | Mackintosh | Sept. 23, 1919 |
| 1,347,207 | Coats | July 20, 1920 |
| 1,752,964 | Prange | Apr. 1, 1930 |
| 2,307,831 | Emery | Jan. 12, 1943 |

FOREIGN PATENTS

| Number | Country | Date |
|---|---|---|
| 116,091 | Australia | Oct. 29, 1942 |